(12) United States Patent
Weber et al.

(10) Patent No.: US 11,429,855 B2
(45) Date of Patent: Aug. 30, 2022

(54) ACCELERATION OF NEURAL NETWORKS USING DEPTH-FIRST PROCESSING

(71) Applicant: NEC Laboratories Europe GmbH, Heidelberg (DE)

(72) Inventors: Nicolas Weber, Dossenheim (DE); Felipe Huici, Dossenheim (DE); Mathias Niepert, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 1033 days.

(21) Appl. No.: 15/889,275

(22) Filed: Feb. 6, 2018

(65) Prior Publication Data

US 2019/0244091 A1    Aug. 8, 2019

(51) Int. Cl.
*G06N 3/08* (2006.01)
*G06N 3/063* (2006.01)
*G06N 3/04* (2006.01)

(52) U.S. Cl.
CPC .......... *G06N 3/08* (2013.01); *G06N 3/04* (2013.01); *G06N 3/063* (2013.01)

(58) Field of Classification Search
CPC .. G06N 3/08; G06N 3/02; G06N 3/04; G06N 3/0454; G06N 3/063; G06N 20/00
See application file for complete search history.

(56) References Cited

U.S. PATENT DOCUMENTS

| | | | |
|---|---|---|---|
| 10,409,560 B1* | 9/2019 | Bebee | G06F 8/71 |
| 2010/0088490 A1* | 4/2010 | Chakradhar | G06N 3/084 |
| | | | 712/34 |
| 2016/0364644 A1 | 12/2016 | Brothers et al. | |
| 2018/0060719 A1* | 3/2018 | Kisilev | G06N 3/0454 |
| 2019/0181887 A1* | 6/2019 | Banerjee | H03M 13/3761 |
| 2019/0220734 A1* | 7/2019 | Ferdman | G06N 3/063 |
| 2020/0258194 A1* | 8/2020 | Morita | H04N 9/04515 |

OTHER PUBLICATIONS

Gao, Mingyu, et al. "Tetris: Scalable and efficient neural network acceleration with 3d memory." Proceedings of the Twenty-Second International Conference on Architectural Support for Programming Languages and Operating Systems. 2017. (Year: 2017).*
Manoj Alwani, et al., "Fused-Layer CNN Accelerators", 49th Annual IEEE/ACM Conference, Oct. 2016, pp. 1-12.
Qingcheng Xiao et al: "Exploring Heterogeneous Algorithms for Accelerating Deep Convolutional Neural Networks on FPGAs", DAC '17 Proceedings of the 54th Annual Design Automation Conference 2017, Jun. 18, 2017 (Jun. 18, 2017), pp. 1-6, XP055573913.
Manoj Alwani et al: "Fused-Layer CNN accelerators", 2016 49th Annual/ACM International Symposium on Microarchitecture (MICRO), Oct. 15, 2016 (Oct. 15, 2016), pp. 1-12, XP055573938.

* cited by examiner

*Primary Examiner* — Eric Nilsson
(74) *Attorney, Agent, or Firm* — Leydig, Volt & Mayer, Ltd.

(57) ABSTRACT

A method for accelerating a neural network includes identifying neural network layers that meet a locality constraint. Code is generated to implement depth-first processing for different hardware based on the identified neural network layers. The generated code is used to perform the depth-first processing on the neural network based on the generated code.

14 Claims, 8 Drawing Sheets

```
1  import torch
2  from torch.autograd import Variable
3  import torchvision.models as models
4  import brainslug
5
6  // load the model
7  model = models.__dict__['...']()
8
9  // optimize with BrainSlug
10 brainslug.optimize(model)
11
12 // execute the model
13 model(Variable(...))
```

FIG. 7

```
1  void step_1(input, output, ...):
2      foreach(output):
3          foreach(input):
4              operation_1(...)
5              operation_2(...)
6              operation_3(...)
7          operation_4(...)
8          operation_5(...)
9
10 void sequence_1(input, output, ...):
11     float local[...]
12     step_1(input, local, ...)
13     step_2(local, output, ...)
```

FIG. 8

ACCELERATION OF NEURAL NETWORKS USING DEPTH-FIRST PROCESSING

FIELD

The present invention relates generally to neural networks and in particular to accelerating a neural network.

BACKGROUND

Flexibility of artificial intelligence (AI) and neural networks (NNs) enables a wide range of applications, for example, recommending items in online stores, autonomous driving vehicles, financial fraud detection or optimization of production lines. NNs can be implemented on hardware with central processing units (CPUs) and/or graphical processing units (GPUs). NNs utilize a large number of neurons, and these neurons can be densely connected with multiple layers. Training NNs involves determining weights associated with connections between neurons, and evaluating results of a neural network involves propagation of an input from an input side of the network to an output side of the network. The propagation uses the determined weights during training to perform computations during network evaluation. Depending on interconnection of the NN and the number of neurons involved, computational requirements of NNs during training and evaluation can be prohibitive for some applications.

SUMMARY

In an embodiment, the present invention provides a method for accelerating a neural network. Neural network layers that meet a locality constraint are identified. Code is generated to implement depth-first processing for different hardware based on the identified neural network layers. The generated code is used to perform the depth-first processing on the neural network based on the generated code.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 7 depicts an example pseudocode for using the prototype with PyTorch according to an embodiment of the invention; and FIG. 8 shows example pseudocode of how sequences, steps, and operations can be mapped to actual code.

DETAILED DESCRIPTION

One of the problems unique to AI networks and NNs is their high computational requirements. Depending on the application, these calculations have hard timing requirements, for example, nobody wants their autonomous car to detect an obstacle after the car has already crashed. In addition, training of NNs can take up to several days on high end servers. Therefore, tools and ways of reducing computational complexity by targeting many aspects of the calculations are beneficial.

Hardware manufacturers added floating point units with reduced precision and approximate calculations to their devices. Other approaches use specialized algorithms to reduce the computational complexity. One of the problems that still exists relates to the way neural networks are processed. Neural networks consist of a series of interconnected nodes. Each of these nodes perform an operation. To process with the neural network, data is inputted at the root node, its operation is applied on the data and then the result is passed to the next node. While this breath-first processing is straightforward, it contradicts how processors are supposed to be used. Processors are equipped with caches that are can speed up access to the memory by keeping copies in fast on-chip memories so that when re-accessing the data, it does not need to be fetched from the main memory. However, since neural networks currently generate a large amount of temporary data, caches are constantly trashed, rendering them useless. NNs in the future are projected to generate an even larger amount of data. The trashing of the caches is usually why processors with extremely high memory throughput are used for neural networks in order to keep the processors occupied.

Embodiments of the invention provide a depth-first method for processing computation in a neural network, i.e., for each computational pass all layers for a sub-region of the input data are first calculated, then layers for another sub-region are calculated, until the entire input data are processed. The result is that less temporary memory is used to store intermediate computations between layers such that the amount can fit in GPU and CPU caches, transparently boosting the speed at which neural networks can be trained and used for prediction.

Figure 1:
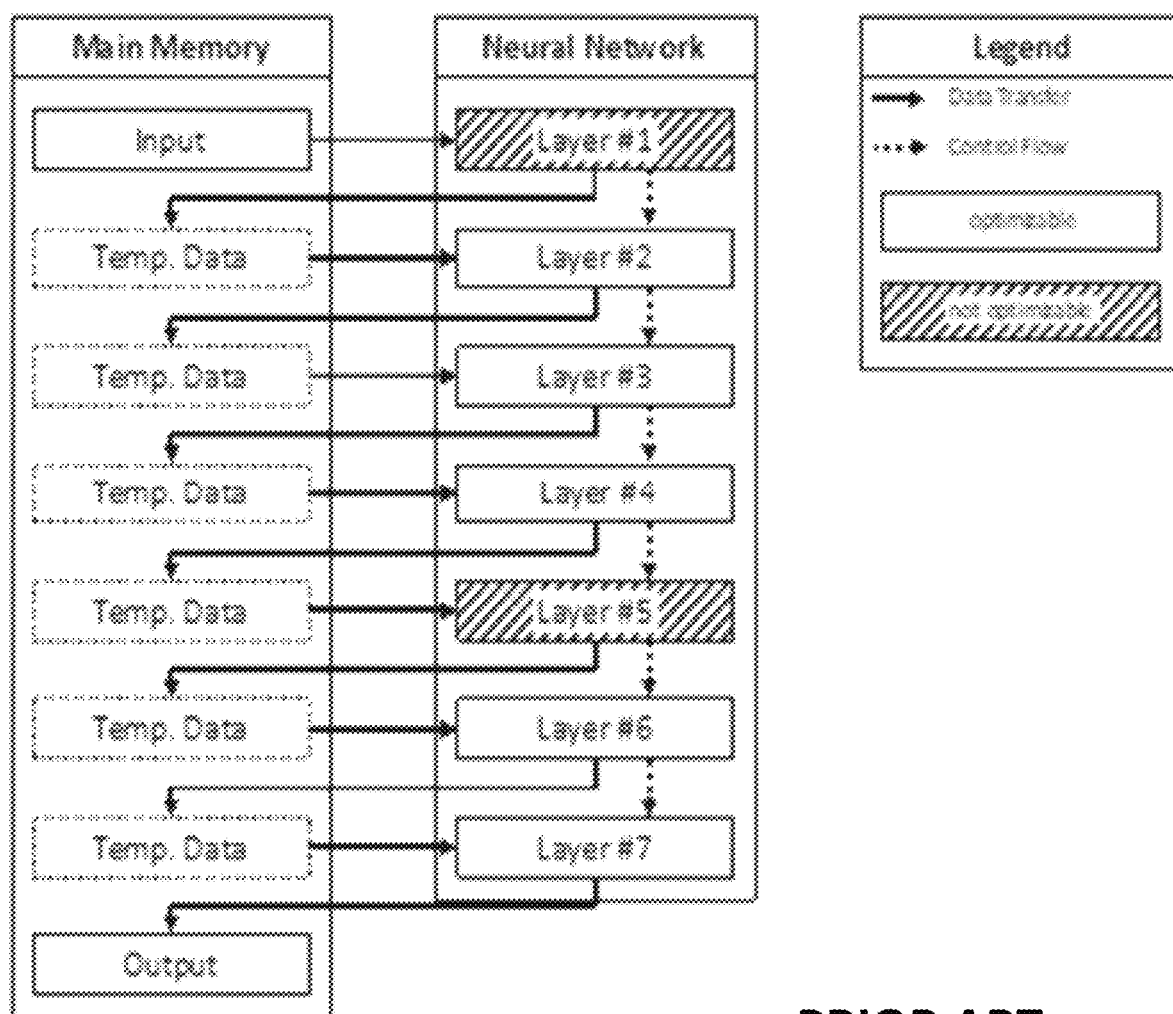
FIG. 1 illustrates a state of the art breath-first processing where each layer is computed in sequence over the entire input data, producing large amounts of temporary data that trashes CPU and GPU caches.

Current state-of-the-art neural network (NN) frameworks process input data (e.g., an image) in sequence, in a breath-first way: take the whole image, perform computations for each layer in the NN in turn, and when finished proceed to process the next image. This process is shown in FIG. 1. The large downside of the approach in FIG. 1 is that it tends to generate relatively large amounts of temporary data for each layer as the computation takes place. Since this temporary data are usually larger than the available side of CPU and GPU caches, this model of processing thrashes them, so that data has to be often fetched from the much slower main memory resulting in under-utilization of hardware's capabilities of computers which may result in increasing training and prediction times. Alwani et al., "Fused-Layer CNN Accelerators," in Proc. MICRO (2016), which is hereby incorporated by reference herein, propose to fuse layers of convolutional neural networks for faster processing on field programmable gate arrays (FPGAs). They can merge the first two convolutional layers of a neural network. In contrast, embodiments of the present invention are not limited to only convolutional layers and aims at accelerating the entire network and not only the first few layers.

Figure 2:
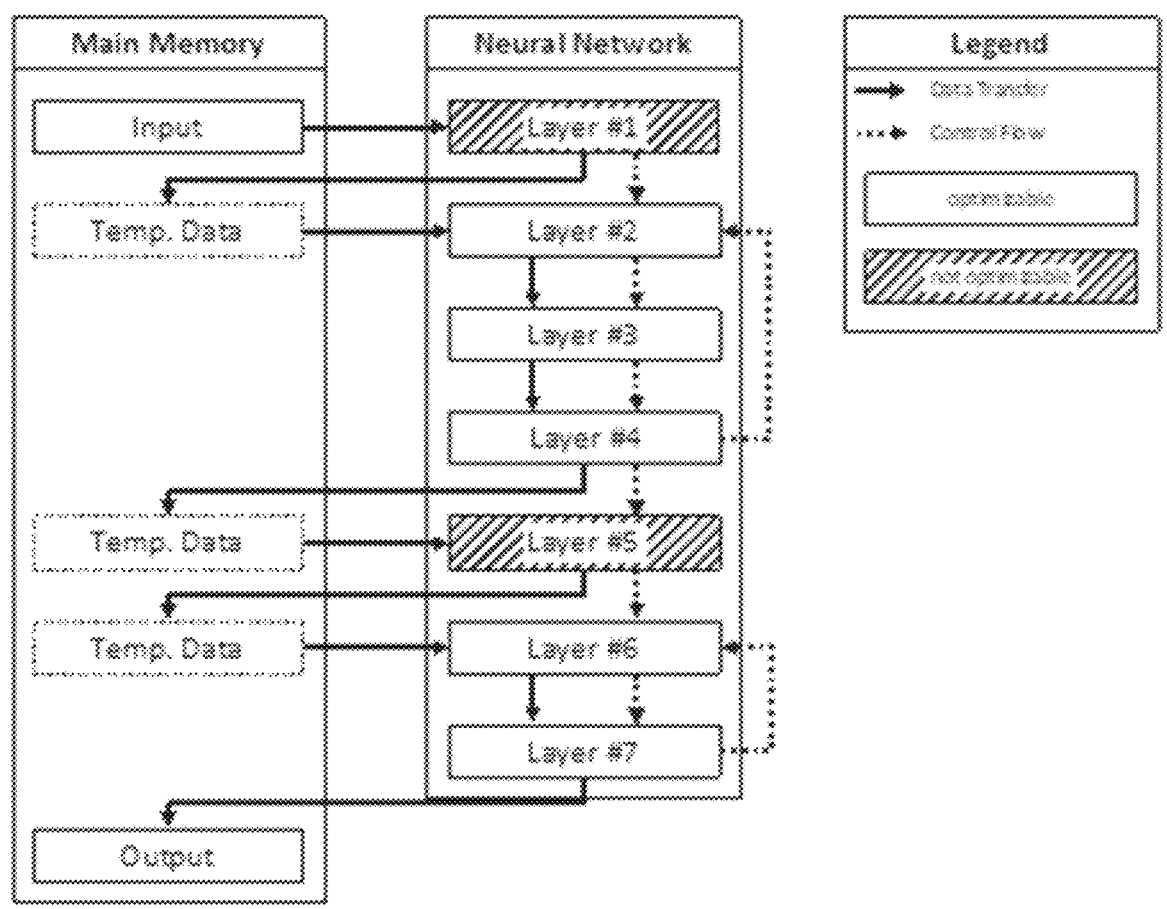
FIG. 2 illustrates a depth-first processing of a neural network according to an embodiment of the invention.

FIG. 2 illustrates a depth-first processing of a neural network according to an embodiment of the invention. In FIG. 2, a sub-portion of input data is processed through all the layers first, then a next sub-portion is processed, and so on until the entire data are processed. In an embodiment, the data is an image, and the sub-portions are sections of that image. By processing the input data in this manner, temporary data produced by the computation of each layer is much smaller than in the conventional breadth-first search of FIG. 1. By processing the input data in this manner, temporary data created can fit in relatively small but very fast caches of GPUs and CPUs, ultimately speeding up the NN's computation since fetches to larger capacity but slower memories may not be necessary.

In FIG. 2, Layers 2-4 and Layers 6-7 meet the locality constraint and operate on sub-portions of the input data, generating a small amount of data that can fit in GPU and CPU caches, speeding up computation time of the NN. The locality constraint is the minimal amount of contiguous input data that a layer needs to operate correctly (i.e., utilizing less than that amount of data, e.g., taking too small a subset of an image, causes the layer's algorithm to fail). Following the flow in FIG. 2, Layer 1 of the neural network, which is not optimizable, processes the entire input data of the main memory, then Layers 2-4 operate on sub-portions of the results of Layer 1. Once all sub-portions have been processed, Layer 5, again non-optimizable, processes results from Layer 4. Finally, Layers 6 and 7 operate on sub-portions of the results of Layer 5.

Figure 3:
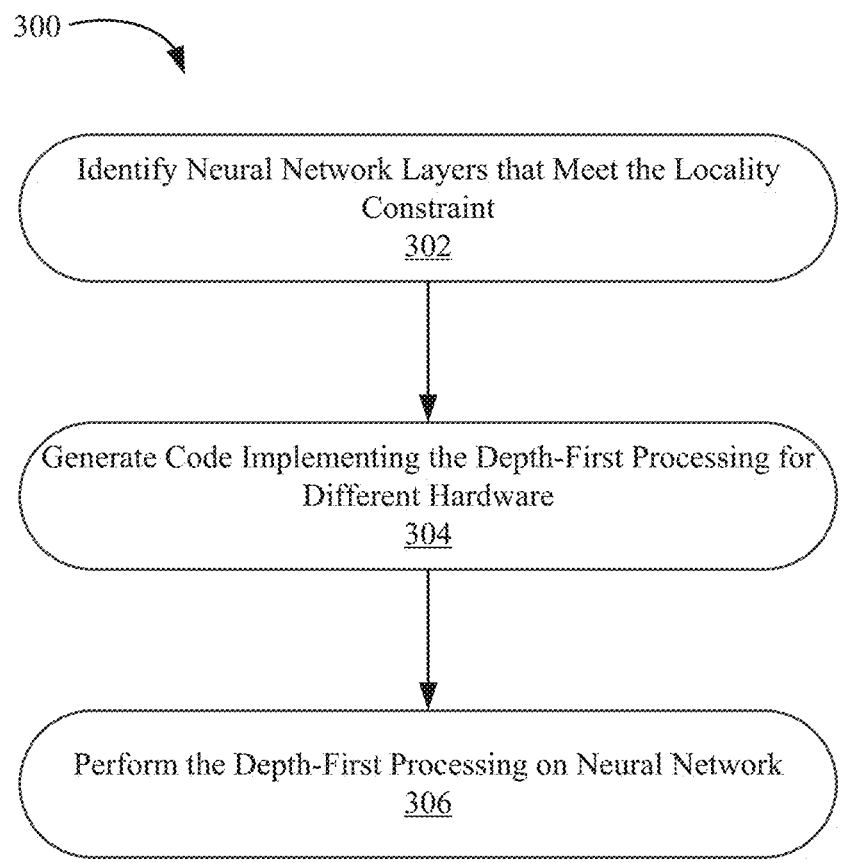
FIG. 3 is a flow chart illustrating a process for transparent acceleration of neural networks according to an embodiment of the disclosure.

FIG. 3 is a flow chart illustrating a process 300, performed by a computer, for transparent acceleration of neural networks according to an embodiment of the disclosure. At step 302, the computer identifies neural network layers that meet the locality constraint. The computer analyzes the neural network layers and automatically identifies the types of layers that meet the locality constraint. Many neural network layer types meet the locality constraint, for example, convolution layers, pooling layers, and so on. In an embodiment, neural network layer types that meet the locality constraint can be provided in a hard-coded list, and as each layer in a network is being analysed, the particular layer is determined whether to be in the hard-coded list of layer types. If the particular layer is in the hard-coded list, then the layer is determined to meet the locality constraint.

At step 304, the computer automatically generates code that implements depth-first processing for different kinds of hardware. The different hardware may include CPUs and GPUs. The code generated operates an area (a specified input size). The code includes one or more operations to be performed based on the functionality of the neural network layers identified to meet the locality constraint. The one or more operations are linked together, and the number of operations linked together is dependent on properties of the hardware which the code is generated for. When generating the code, the area or sub-portion of the input can be adjusted and/or the number of operations linked together can be adjusted based on hardware components.

In an embodiment, the hardware or computer generating the code is separate from one executing the code, e.g., the computer generating the code may have only CPUs but the code being generated is to be run on one or more GPUs of another computer.

In an embodiment, the computer utilizes basic building blocks to generate the code. Once the neural network layers that meet the locality constraint are identified, the operations associated with the neural network layers can be matched to one or more parametric or pre-defined building blocks. For example, if neural network layers that perform accumulation then normalization are identified, the computer can generate an accumulate then normalize code using pre-defined code for accumulation and a pre-defined code for normalization. The pre-defined building blocks in this example are the pre-defined code for accumulation and the pre-defined code for normalization. These pre-defined building blocks can be parametrized to accept a sub-portion of the input when used in the accumulate then normalize code.

At step 306, the computer performs the depth-first processing on the neural network. For the neural network nodes/layers meeting the locality constraint where was code generated in step 304, the generated code is used for the depth-first processing instead of evaluating the neural network in a conventional manner.

Embodiments of the invention are applicable to any NN layer that fulfills the locality constraint, that is, the NN layer can operate on a sub-set of data without producing erroneous results or reducing accuracy. Many such NN layers meet this constraint, for example, convolutions, pooling, and element-wise operations such as normalization, sigmoid, among many others.

Embodiments of the invention include a framework that programmatically analyzes a given neural network within an existing machine learning framework (e.g., PyTorch), identifies layers that fulfill the locality constraint and automatically generates code (and, where available, GPU code) that implements the depth-first method.

Embodiments of the invention provide a depth-first approach, so that instead of computing the entire data set at the same time, only a small portion of the data is used at a time. On this portion of the data the entire network is applied, before the next portion is processed. This depth-first approach allows data to be kept in the cache, reducing the necessity to continually read and write large amounts of data from main memory. Embodiments of the invention identify specific operations that allow process only a smaller portion of the data. Additionally, the embodiments generate specialized compute kernels for each possible sequence of operations.

Embodiments of the invention provide a method for efficiently building specialized compute kernels for neural networks that leverage data locality to improve computational performance. The embodiments map widely used neural network operations onto a set of building blocks that can be used to generate efficient compute kernels for a given neural network. Actual computation is not altered, so that results of computing are identical to conventional means of processing.

In order to merge multiple neural network functions, embodiments of the invention reutilize common analogies in the processing of neural network layers. First of all, the existing neural network is analysed to identify parts that perform a serial processing of functions that can be merged. Serial processing that can be merged are referred to as a stack. Each function in a stack is then mapped onto one or multiple operations. For example, an average-pooling consists of an accumulating operation and a normalization operation. Each operation itself can require a specific iterating loop type. For the accumulating operation of average-pooling, all data in a certain area (further called patch) are processed. The normalization operation, on the other hand, does not have any requirements, except that it has to be executed after all data is accumulated. In order to merge these operations, steps are built. All operations are added to a step until an operation is encountered with a required loop type. After this required loop type operation is added, only operations without requirements can be further added. As soon as another operation with a required loop type is encountered, this step is completed and a new one is created. This procedure is repeated until all operations have been assigned to a step.

Figure 4:
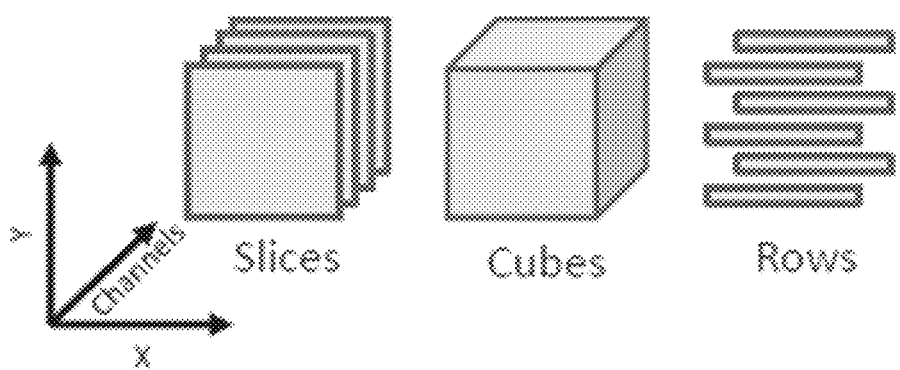
FIG. 4 illustrates examples of different loop types according to an embodiment of the invention.

FIG. 4 illustrates examples of loop types according to an embodiment of the invention. Slices operate on a certain patch, but independently for each channel, e.g., average-/max-pooling. Cubes operate on a certain patch and all channels, e.g., convolution. Rows operate on a single data line, e.g., linear.

Figure 5:
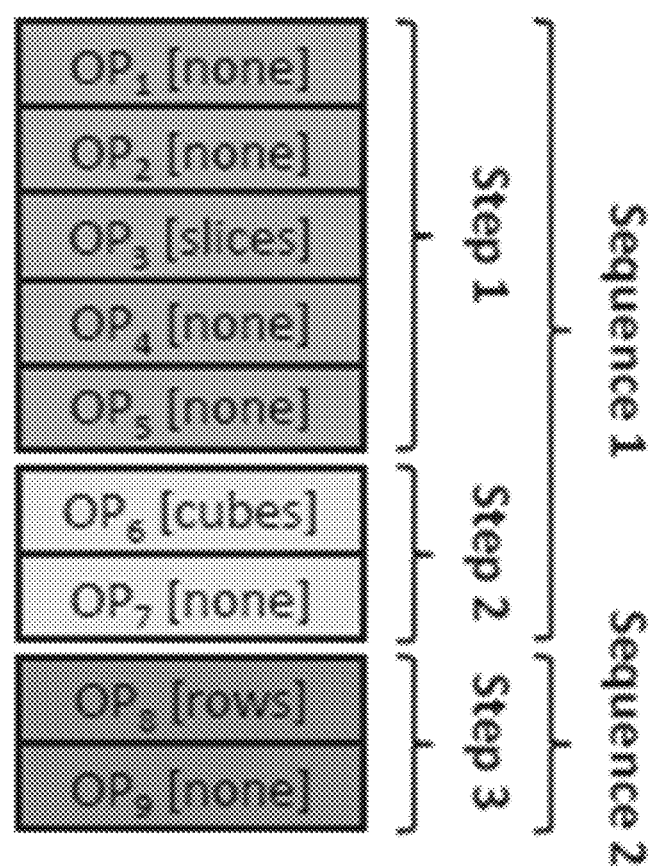
FIG. 5 illustrates how operations are mapped onto steps and then merged into sequences according to an embodiment of the invention.

After building all steps, the steps may be grouped into sequences. As already mentioned, each step has a dominant operation that requires a certain loop type. Only steps that have compatible loop types can be put into the same sequence. For example, a convolution (cubes-type) operates on a patch and all channels. As pooling (slices-type) works also on a patch, but is independent for each channel it is compatible with a convolution and can be merged into the same sequence using the cubes scheme. On the other hand, for example, the linear function requires operation on a row in the data, so it is neither compatible with a convolution nor a pooling layer, and therefore, cannot be merged together. FIG. 5 illustrates an example of how operations are mapped onto steps and then merged into sequences according to an embodiment of the invention.

This stacking of steps into a sequence is not necessarily a good decision. Some operations such as convolutions reduce the amount of data through processing. To prevent this effect usually after processing, the resulting data is padded. However, when stacking multiple convolutions the amount of overlapping data between different patches increases. Thus, there is an increase in the amount of data required for this sequence. To handle this, two criteria may be considered, the first, dealing with the subset of input data being considered; and the second, dealing with different channels that may be utilized.

In an embodiment, when adding a step to a sequence a check is performed to determine how the step influences the data requirements of the sequence. Depending on the used hardware, the two criteria may be used to achieve good performance. In the first criteria, the amount of available memory is limited to a certain memory threshold, e.g., on a GPU this would be the size of its fastest caches (shared memory). If this memory threshold is exceeded, then an attempt to iteratively shrink the size of the patch is made. During the attempt, in the second criteria, if the patch size drops below a size threshold, a minimum size to fully leverage all single instruction multiple data (SIMD) units in every step, then the step is not added to the sequence, as it would yield an underutilization of the hardware. Instead another sequence is created for the step. As different hardware has different number of SIMD units and available on-chip memory resources, this can result in different sequence constellations for each hardware. For example, CPUs usually have fewer SIMD units and more on-chip memory resources compared to GPUs, so it is more likely to have sequences with many steps on a CPU compared to a GPU.

Figure 6:
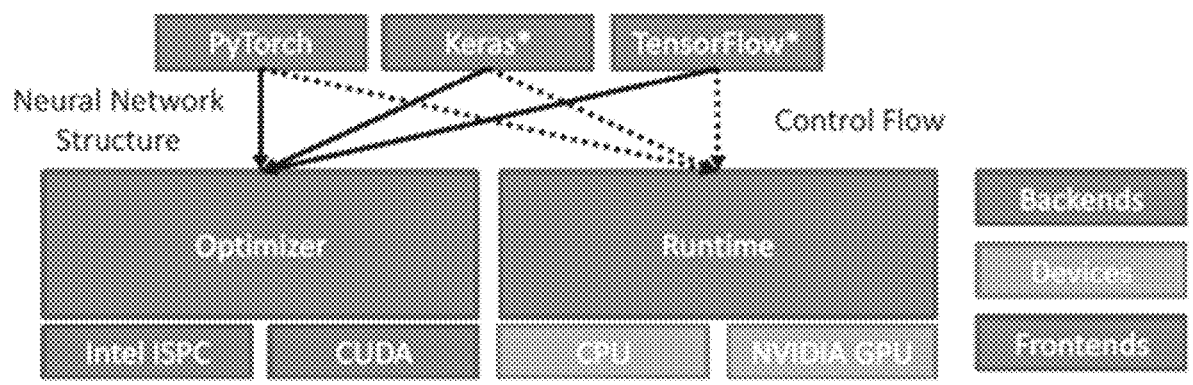
FIG. 6 illustrates a system architecture of a prototype according to an embodiment of the invention.

An embodiment of the invention was implemented as a prototype. FIG. 6 illustrates an overview of the prototype. The prototype consists of two main components: an optimizer and a runtime system. To attach the prototype to existing neural network frameworks, a specialized frontend is used for each framework. These frontends map the framework calls onto the prototype's API.

For testing the prototype, a PyTorch frontend was implemented. PyTorch was chosen as it is the first neural network framework using a dynamic network graph that can be reshaped at runtime. The reconfiguration/reshaping complicates implementation, but it shows that embodiments of the invention can be applied even in highly dynamic scenarios. An analysis was performed on the neural network, parsing through the network to identify sequential operations that can be optimized using the prototype.

Once identified, the parts of the neural network that can be optimized were passed into the prototype's optimizer. Furthermore, all nodes from the network that were optimized were removed and replaced with special nodes of the prototype that pass the control flow to the prototype runtime whenever triggered. Each node represents one stack. If there were multiple equivalent stacks, the prototype only generated code for the stack once and reused the code for all reoccurring stacks. FIG. 7 shows an example pseudocode of how to use the prototype with PyTorch.

The optimizer in FIG. 6 is responsible for analyzing the neural network and generating optimized kernel code for all available devices. In an embodiment, predefined building blocks are used to construct the kernels. FIG. 8 shows example pseudocode of how sequences, steps, and operations can be mapped to actual code.

For processing the data, two scenarios are distinguished. When there is only one step inside a sequence, the entire input data is iterated over. Data locality is achieved through directly passing the data between the operations. If there is more than one step in a sequence, then a synchronization between the steps is performed since the second step may utilize all the data from the first step. Thus, explicitly storing data passed from one step to another is required. In an embodiment, a small local storage can be used to pass data between steps. The size of this storage depends on the operations that a particular layer is to perform, parameters associated with the operations, and the size of the data patch that is processed at once. Optimal patch size can be determined as already described in the disclosure.

GPUs are predominantly used for processing neural networks mainly because of their high compute performance and memory throughput. The implementation for the pre-defined building blocks was straightforward and did not use any special hardware functionality. The pre-defined building blocks are sections of code that execute loops on specific target architectures, e.g., CPUs, GPUs, field programmable gate arrays (FPGAs), and so on. For the local storage, the shared memory was used. The shared memory is a self-organized, on-chip cache shared between all SIMD units in a GPU processor. It is limited to 64 or 92 kB (depending on the used GPU). However, if the entire cache is used, the GPU is unable to schedule multiple compute instances onto the processor. This can have a negative impact on performance as the GPU has less opportunities to employ latency hiding. Therefore, the prototype was limited to using at max 16 kB of shared memory. Furthermore 128 threads were employed, utilizing all available SIMD units in the GPU processor. As neural networks do not require highly precise calculations, fast and approximate calculations were employed when applicable.

For a CPU implementation, the Intel SPMD Program Compiler3 (ISPC) was used. ISPC can be seen as "CUDA for CPUs." It allows adding syntactic sugar to an application and explicitly defining which computations should be done by a single SIMD unit. Because of the similarities between ISPC and CUDA, many parts of implementing some embodiments of the invention can be shared between both architectures. ISPC can target different instruction sets, e.g., streaming SIMD extensions (SSE), advanced vector extensions (AVX) and AVX-512 for Intel's Knight's Landing. Default values were used from the compiler in the CPU implementation. Also fast and approximate calculations were employed when applicable.

The runtime system of the prototype handles the execution of the compute kernels. As embodiments of the invention can result in a large number of different kernel implementations, the kernels are loaded in lazily whenever they are called for the first time. The runtime component in FIG. 6 was kept extremely slim, so that it does not produce too much unnecessary overhead. There was no on-the-fly scheduling or anything else happening. If there was more than once sequence in a stack, these were executed serially.

All tests were run on a server with dual Intel Xeon E5-2637v4, 128 GB DDR4-2400 and a NVIDIA GeForce GTX 1080 Ti. For software packages, the tests utilized Debian 9, NVIDIA GPU driver v384.81, CUDA v9.0, ISPC v1.9.2, Python v3.5.3 and PyTorch v0.3.0.

The prototype seamlessly integrates into PyTorch and transparently accelerates the processing of the network without any user interaction. The prototype currently supports code generation for NVIDIA GPUs and CPUs and achieves speedups of up to 35% on GPUs and 41% on CPUs, compared to the identical network running PyTorch.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for accelerating a neural network, the method comprising:
    identifying neural network layers that meet a locality constraint;
    generating code for different hardware based on the identified neural network layers, wherein the generated code is used to implement depth first processing on the neural network, and wherein the different hardware comprises one or more central processing units (CPUs) or graphical processing units (GPUs); and
    performing the depth-first processing on the neural network based on the generated code,
    wherein identifying the neural network layers comprises:
        identifying parts of the neural network that perform a serial processing of functions that are mergeable to obtain a stack; and
        mapping each function in the stack to obtain at least one operation, wherein each operation has a loop type property designating whether the operation is based on a convolution layer, a pooling layer, or an element-wise operational layer, and wherein the loop type property designates whether the operation has a requirement for data evaluation.

2. The method according to claim 1, wherein generating the code comprises:
    determining one or more pre-defined building blocks from the identified neural network layers; and
    combining the one or more pre-defined building blocks to obtain the code.

3. The method according to claim 1, wherein the CPUs include fewer single instruction multiple data (SIMD) units compared to the GPUs.

4. The method according to claim 1, wherein the at least one operation comprises an accumulation operation and a normalization operation, and wherein the accumulation operation has a loop type property requiring data to be processed in a certain area and the normalization operation has a loop type property with no data requirements.

5. The method according to claim 1, wherein identifying the neural network layers further comprises:
    merging the at least one operation into one or more steps, wherein a step includes only one operation with a loop type property designating that the one operation has a requirement for data evaluation.

6. The method according to claim 5, wherein identifying the neural network layers further comprises:
    grouping the one or more steps into one or more sequences, wherein a sequence includes steps with compatible loop types.

7. The method according to claim 6, wherein sequences in the one or more sequences intended for CPUs have more steps than sequences in the one or more sequences intended for GPUs.

8. The method according to claim 7, wherein a patch size is reduced based on available memory exceeding the memory threshold, the patch size being related to an amount of data input to the sequence.

9. The method according to claim 8, wherein reduction of the patch size is limited by an underutilization of the different hardware.

10. The method according to claim 6, wherein grouping the one or more steps into the one or more sequences includes determining how each step grouped in a sequence influences data requirements of the sequence so as to reduce an amount of available memory below a memory threshold.

11. The method according to claim 5, wherein the step further includes a second operation with a loop type property designating that the second operation does not have a requirement for data evaluation.

12. The method according to claim 1, wherein the stack comprises a first subset of neural network layers from the neural network layers, and
    wherein generating the code for the different hardware based on the identified neural network layers comprises:

generating code to loop back and re-process the first subset of neural network layers after completing an iteration of processing the first subset of neural network layers.

13. The method according to claim 1, wherein the stack comprises a first subset of neural network layers from the neural network layers, wherein the neural network layers further comprise at least one other neural network layer that is immediately subsequent to the first subset of neural network layers, and wherein generating the code for the different hardware based on the identified neural network layers comprises:

generating code to:
process the first subset of neural network layers;
store an output from processing the first subset of neural network layers in main memory; and
process the at least one other neural network layer based on retrieving the output from the main memory.

14. A system for accelerating a neural network, the system comprising one or more processors which, alone or in combination, are configured to provide for execution of the following steps:

identifying neural network layers that meet a locality constraint;

generating code for different hardware based on the identified neural network layers, wherein the generated code is used to implement depth first processing on the neural network, and wherein the different hardware comprises one or more central processing units (CPUs) or graphical processing units (GPUs); and performing the depth-first processing on the neural network based on the generated code, wherein identifying the neural network layers comprises:

identifying parts of the neural network that perform a serial processing of functions that are mergeable to obtain a stack; and mapping each function in the stack to obtain at least one operation, wherein each operation has a loop type property designating whether the operation is based on a convolution layer, a pooling layer, or an element-wise operational layer, and wherein the loop type property designates whether the operation has a requirement for data evaluation.

* * * * *